(12) United States Patent
Shilale et al.

(10) Patent No.: US 6,569,369 B2
(45) Date of Patent: May 27, 2003

(54) FABRICATING CONTINUOUSLY CONNECTED FASTENER STOCK

(75) Inventors: Thomas Shilale, Douglas, MA (US); William J. Cooper, Woonsocket, RI (US); Steven E. Flannery, Wayland, MA (US); Jeffrey A. Raymond, Leominster, MA (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/904,173

(22) Filed: Jul. 12, 2001

(65) Prior Publication Data

US 2003/0011096 A1 Jan. 16, 2003

(51) Int. Cl.[7] ............................................... B29C 47/00
(52) U.S. Cl. ...................................... 264/167; 264/145
(58) Field of Search ................................ 264/167, 145, 264/161, 163; 425/223, 224, 220, 292; 428/131

(56) References Cited

U.S. PATENT DOCUMENTS

| | | | |
|---|---|---|---|
| 3,103,666 A | | 9/1963 | Bone |
| 3,872,806 A | | 3/1975 | Bone |
| 3,990,619 A | | 11/1976 | Russell |
| 4,039,078 A | | 8/1977 | Bone |
| 4,231,826 A | * | 11/1980 | Wrast et al. ................. 156/138 |
| 4,456,161 A | | 6/1984 | Russell |
| 4,461,738 A | * | 7/1984 | Russell ........................ 264/145 |
| 4,462,784 A | * | 7/1984 | Russell ........................ 425/223 |
| 4,533,076 A | | 8/1985 | Bourque |
| 4,712,677 A | * | 12/1987 | Russell ........................ 206/340 |
| 5,489,057 A | | 2/1996 | Deschenes |
| 5,949,336 A | * | 9/1999 | Deschenes et al. ...... 264/297.6 |
| 5,979,027 A | * | 11/1999 | Oh et al. .................... 24/704.1 |
| 5,987,719 A | | 11/1999 | Cooper |
| 6,064,306 A | * | 5/2000 | Deschenes et al. ...... 264/297.6 |

* cited by examiner

*Primary Examiner*—Mark Eashoo
(74) *Attorney, Agent, or Firm*—Kriegsman & Kriegsman (57) ABSTRACT

Continuously connected fastener stock and a method of making same. In one embodiment, the method involves providing a rotating molding wheel, the wheel being provided with a peripheral impression comprising a pair of peripherally-extending side members interconnected by a plurality of cross-links. Molten plastic is extruded into the peripheral impression of the wheel, with a layer of controlled film overlying the peripheral impression. The molten plastic is then allowed to solidify. A knife in substantially elliptical contact with the peripheral impression is then used to skive excess plastic from the rotating molding wheel. The knife is provided with a pair of cut-out portions along its bottom edge, each cut-out portion being aligned with one of the peripherally-extending side members so as to augment the transverse cross-sectional size thereof. The continuously connected fastener stock thus formed is then removed from the rotating molding wheel.

7 Claims, 6 Drawing Sheets

FABRICATING CONTINUOUSLY CONNECTED FASTENER STOCK

BACKGROUND OF THE INVENTION

The present invention relates generally to plastic fasteners of the type that are adapted, for example, to attach tags to articles of commerce and relates more particularly to a novel method of manufacturing a plurality of said plastic fasteners as continuously connected fastener stock and to the continuously connected fastener stock thus made.

Plastic fasteners of the type comprising an elongated flexible filament having a first cross-bar at one end and a second cross-bar (or other enlargement, such as a paddle or a knob) at the opposite end are well-known and have been widely used in a variety of applications, such as in the attachment of merchandise tags to articles of commerce, in the attachment of buttons to garments, in the lasting of shoes, and in various packaging applications. Typically, such plastic fasteners are mass-produced by molding processes into either one of two different types of assemblies. One such assembly, an example of which is disclosed in U.S. Pat. No. 3,103,666, inventor Bone, issued Sep. 17, 1963 (which patent is incorporated herein by reference), is a clip-type assembly, said clip comprising a plurality of fasteners, each such fastener comprising a flexible filament having a first cross-bar at one end thereof and a paddle or second cross-bar at the opposite end thereof. The fasteners are arranged in a spaced, side-by-side orientation, with the respective first cross-bars parallel to one another and the respective paddles or second cross-bars parallel to one another, each of the first cross-bars being joined to a common, orthogonally-disposed runner bar by a severable connector. Adjacent second cross-bars or paddles also may be interconnected by severable connectors extending therebetween.

The aforementioned fastener clip is typically made by injection molding. Several commercial embodiments of the above-described fastener clip have been sold by the present assignee, Avery Dennison Corporation, as DENNISON® SWIFTACH® fastener clips.

A second type of fastener assembly is known as continuously connected fastener stock. In one type of continuously connected stock, the fastener stock is formed from two elongated, uniform and continuous side members coupled together by a plurality of cross-links equidistantly-spaced apart by a distance of 0.25 inch. Individual fasteners having an H-shape, often referred to as "plastic staples," are dispensed from the fastener stock by cutting the side members at appropriate points between cross-links, thereby yielding individual fasteners having cross-bars of 0.25 inch in length. In another type of continuously connected stock, the fasteners comprise a flexible filament having a cross-bar at one end thereof and a paddle (or second cross-bar) at the opposite end thereof, the respective cross-bars and paddles of successive fasteners being arranged end-to-end and being joined together by severable connectors to form continuous, albeit non-uniform, side members.

An example of continuously connected fastener stock is disclosed in U.S. Pat. No. 4,039,078, inventor Bone, issued Aug. 2, 1977 (which patent is incorporated herein by reference). In said patent, the continuously connected fastener is described as being made by one of two different methods. The first of said two methods comprises extruding a continuous strip of plastic and then punching out or forming apertures in the strip in such a way as to leave only the side members and the cross-links in the strip, said side members and said cross-links being rectangular in cross-section. The other of said two methods comprises injection molding two or more separate lengths of the fastener stock and then joining together the lengths by applying heat to weld the respective side members together, said side members and said cross-links being circular in cross-section.

Neither of the two methods described above has received much, if any, commercial use in the manufacturing of continuously connected fastener stock.

Another example of continuously connected fastener stock is described in U.S. Pat. No. 4,462,784, inventor Russell, issued Jul. 31, 1984 (which patent is incorporated herein by reference). In said patent, the continuously connected fastener stock is made by a rotary extrusion process that involves the use of a rotating molding wheel whose periphery is provided with molding cavities that are complementary in shape to the molded fastener stock. To form fasteners, plastic is extruded into the cavities of the molding wheel, and a knife in substantially elliptical contact with the wheel is used to skive excess plastic from the molding wheel, leaving plastic only in the molding cavities. Following molding, the filament portions of the fasteners are typically stretched.

The aforementioned rotary extrusion technique has been used extensively by the present assignee in the manufacturing of continuously connected fastener stock. As can readily be appreciated, some advantages of the above-described rotary extrusion technique, as compared to the injection molding/welding technique described above, are that virtually any length of fastener stock can be obtained and that the post-molding welding step is eliminated.

However, one consequence of the rotary extrusion process described above, particularly the skiving step thereof, is that the first cross-bar, the filament, and the second cross-bar (or paddle) of each fastener are all flat on one side thereof, with the flattened sides of the first cross-bar, the filament and the second cross-bar all lying in the same plane (see e.g., FIG. 1B of U.S. Pat. No. 4,462,784). The other surfaces of the first-cross bar, the filament, and the second cross-bar (or paddle) conform to the shapes of the molding cavities and are typically not flat. For example, the other surface of the cross-bar (and the filament) is typically curved, thereby resulting in a cross-bar (and a filament) whose transverse cross-section has a shape resembling a semicircle or semi-ellipse. This property of the continuously connected stock of U.S. Pat. No. 4,462,784 of being shaped so as to be flat on only one side is apparently not shared by the continuously connected fastener stock of U.S. Pat. No. 4,039,078.

Tools (often referred to as "tagging guns" or "fastener attaching tools") for dispensing individual fasteners from continuously connected fastener stock above are known, examples of such tools being disclosed in the following U.S. patents, all of which are incorporated herein by reference: U.S. Pat. No. 4,039,078, inventor Bone, which issued Aug. 2, 1977; U.S. Pat. No. 5,433,366, inventors Deschenes et al., which issued Jul. 18, 1995; U.S. Pat. No. 4,121,487, inventor Bone, which issued Oct. 24, 1978; U.S. Pat. No. 5,320, 269, inventors Deschenes et al., which issued Jun. 14, 1994; U.S. Pat. No. 4,955,475, inventors McCarthy et al., which issued Sep. 11, 1990; U.S. Pat. No. 4,456,161, inventor Russell, which issued Jun. 26, 1984; U.S. Pat. No. 5,024, 365, inventor Bourque, which issued Jun. 18, 1991; and U.S. Pat. No. 4,998,661, inventors Deschenes et al., which issued Mar. 12, 1991.

Such tools typically comprise a needle, the needle typically including a stem portion. The stem portion typically is generally cylindrical in shape and has a longitudinally-extending, cylindrically-shaped bore adapted to receive the first cross-bar of a fastener. In addition, said stem portion also typically has a longitudinally-extending slot adapted to permit the filament portion of a fastener to extend therethrough while the first cross-bar of the fastener is disposed in the longitudinal bore of the stem portion. The stem portion also typically has a tip adapted for insertion into a desired article of commerce. The needle also may include a base portion, said base portion being attached to the rear of the stem portion and being adapted to be removably received in the tool. The stem portion and the base portion may be a unitary structure or, as is more often the case, the base portion is insert-molded onto the rear end of the stem portion.

Such tools also typically comprise an ejector rod for ejecting a first cross-bar from the needle and into the article of commerce and may also include a knife or similar severing means for cutting the severable connector between the first cross-bar being dispensed and its adjacent first cross-bar and feeding means for advancing the assembly of fasteners in the tool so as to align the forwardmost first cross-bar with the needle.

One problem that has been noted by the present inventor with respect to the dispensing of continuously connected fastener stock of the type described in U.S. Pat. No. 4,462,784 using needles of the type described above is that, whereas the longitudinal bore and the longitudinal slot together have a symmetric transverse cross-sectional shape resembling an inverse lollipop (the longitudinal bore being circular in transverse cross-section, the longitudinal slot being rectangular in transverse cross-section and bisecting said longitudinal bore at the top thereof), the first cross-bar and the filament together have a "d"-shaped cross-section. Consequently, because a considerable portion of the transverse cross-sectional area of the bore is not occupied by the cross-bar, proper engagement of the cross-bar by the ejector rod and proper translational movement of the cross-bar through the length of the bore due to action of the ejector rod is not always achieved. This results in occasional malfunctioning of the tool.

SUMMARY OF THE INVENTION

It is an object of the present invention to provide a new method of manufacturing continuously connected fastener stock.

It is another object of the present invention to provide a method as described above that overcomes at least some of the problems described herein that are associated with existing methods for manufacturing continuously connected fastener stock.

According to one aspect of the invention, there is provided a method of manufacturing continuously connected fastener stock, said method comprising the steps of:

(a) providing a rotating molding wheel, said rotating molding wheel being provided with a peripheral impression comprising a pair of peripherally-extending side members interconnected by a plurality of cross-links;

(b) extruding molten plastic into the peripheral impression of said rotating molding wheel, with a layer of controlled film overlying the peripheral impression;

(c) allowing the molten plastic to solidify;

(d) using a knife in substantially elliptical contact with the peripheral impression to skive excess plastic from the rotating molding wheel, said knife having a bottom provided with a first cut-out portion aligned with one of said peripherally-extending side members so as to augment the transverse cross-sectional size thereof; and (e) removing the continuously connected fastener stock thus formed from the rotating molding wheel.

Preferably, the peripheral impression is formed around the entire periphery of the rotating molding wheel, and the bottom of said knife is further provided with a second cut-out portion aligned with the other of said peripherally-extending side members so as to augment the transverse cross-sectional size thereof. In one embodiment, each of the peripherally-extending side members of said peripheral impression is generally uniform and semi-elliptical in transverse cross-section, each of said cross-links of said peripheral impression is generally semi-circular in transverse cross-section, and each of said first and second cut-out portions is complementarily shaped relative to its respective peripherally-extending side member of said peripheral impression so that each cross-link of the continuously connected fastener stock symmetrically bisects the side members of the continuously connected fastener stock.

In another embodiment, each of said peripherally-extending side members of said peripheral impression is generally rectangular in transverse cross-section, each of said cross-links of said peripheral impression is generally semi-circular in transverse cross-section, and each of said first and second cut-out portions is complementarily shaped relative to its respective peripherally-extending side member of said peripheral impression so that each cross-link of the continuously connected fastener stock symmetrically bisects the side members of the continuously connected fastener stock.

The present invention is also directed to a length of continuously connected fastener stock fabricated according to the above-described method.

According to another aspect of the invention, there is provided a length of continuously connected fastener stock, said length of continuously connected fastener stock comprising (a) first and second side members; and (b) a plurality of cross-links interconnecting said first and second side members, each of said cross-links having a flat surface and an arcuate surface; (c) wherein said first side member is shaped to extend transversely beyond said flat surface.

According to still another aspect of the invention, there is provided a length of continuously connected fastener stock, said length of continuously connected fastener comprising (a) first and second side members; and (b) a plurality of cross-links interconnecting said first and second side members, each of said cross-links having a flat surface; (c) wherein said first side member is shaped to extend transversely beyond said flat surface with an arcuate surface.

Additional objects, features, aspects and advantages of the present invention will be set forth, in part, in the description which follows and, in part, will be obvious from the description or may be learned by practice of the invention. In the description, reference is made to the accompanying drawings which form a part thereof and in which is shown by way of illustration specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute apart of this specification, illustrate preferred embodiments of the invention and, together with the description, serve to explain the principles of the invention. In the drawings wherein like reference numerals represent like parts.

DETAILED DESCRIPTION OF PREFERRED EMBODIMENTS

Figure 1:
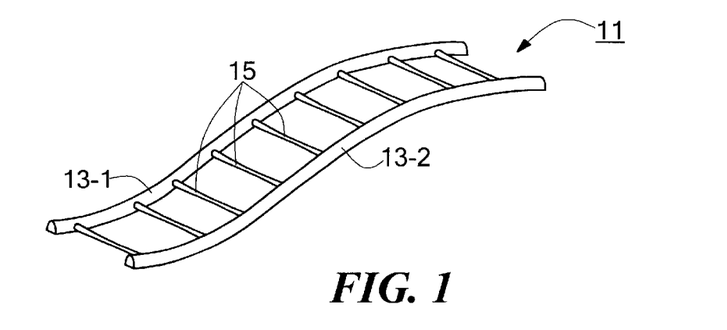
FIG. 1 is a perspective view of a length of continuously connected fastener stock of the plastic staple variety fabricated using the conventional rotary extrusion technique.

Referring now to FIG. 1, there is shown a perspective view of a length of continuously connected fastener stock of the plastic staple variety that has been fabricated using the conventional rotary extrusion technique described above, said length of fastener stock being represented generally by reference numeral 11.

Fastener stock 11, which is typically made of polyurethane, comprises two elongated, uniform and continuous side members 13-1 and 13-2. Side members 13-1 and 13-2 are coupled together by a plurality of flexible cross-links or filaments 15, cross-links 15 being equidistantly spaced apart by a distance of 0.25 inch. By cutting side members 13-1 and 13-2 at appropriate points between cross-links 15, individual fasteners having an H-shape, often referred to as "plastic staples," are produced. Each of the cross-bars of an individual plastic staple has a length of 0.25 inch.

Figure 1A:
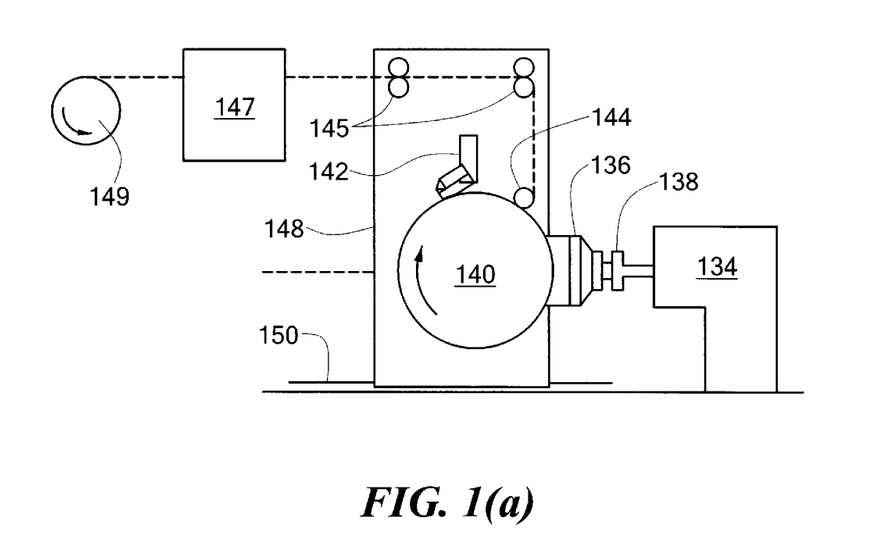
FIG. 1(a) is a schematic elevational view of a conventional rotary extrusion continuous molding system.

Referring now to FIG. 1(a), there is shown a molding system for use in making fastener stock 11, said molding system being represented generally by reference numeral 131. System 131 includes an extruder 134, a manifold assembly 136, a manifold mount 138, a rotatable molding wheel 140, a skiving knife and hold-down assembly 142, a take-off roll 144, transfer rolls 145 and a windup roll 149. The fastener stock may be passed prior to wind-up through a stretching apparatus 147 of the type shown, for example, in FIGS. 6A through 6E of U.S. Pat. No. 4,462,784, to decrease the size of filaments 15 and increase their strength and flexibility. A mounting plate 148 is provided for mounting the knife 142 and transfer rolls 145. The axis of rotation for wheel 140 extends through plate 148. The plate 148, together with a mechanism (not shown) located behind the plate for driving wheel 140 and rolls 145, may be mounted on one or more rails 150 for moving the molding wheel 140 toward and away from the manifold 136.

Figure 1B:
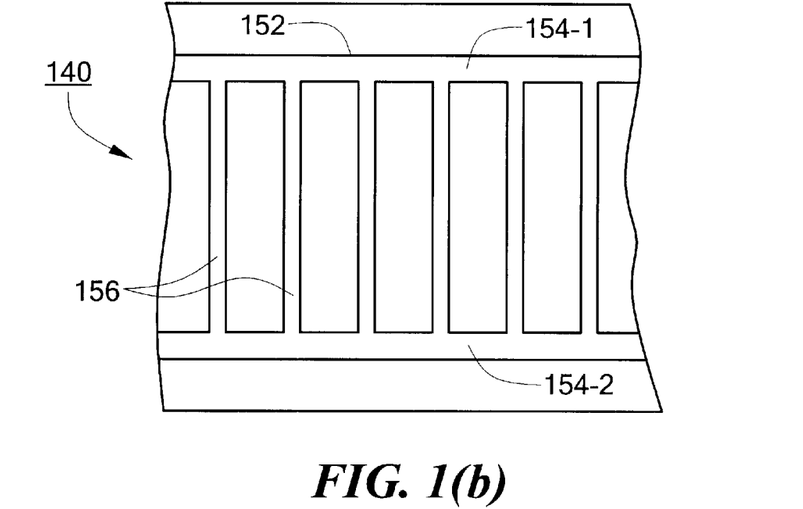
FIG. 1(b) is a fragmentary top view of the molding wheel shown in FIG. 1(a)

Referring now to FIG. 1(b), there is shown a fragmentary top view of wheel 140. As can be seen, wheel 140 is provided with a peripheral impression 152 complementary in shape to the fastener stock, peripheral impression 152 comprising a pair of peripherally-extending side members 154-1 and 154-2 interconnected by a plurality of cross-links 156.

Figure 2:
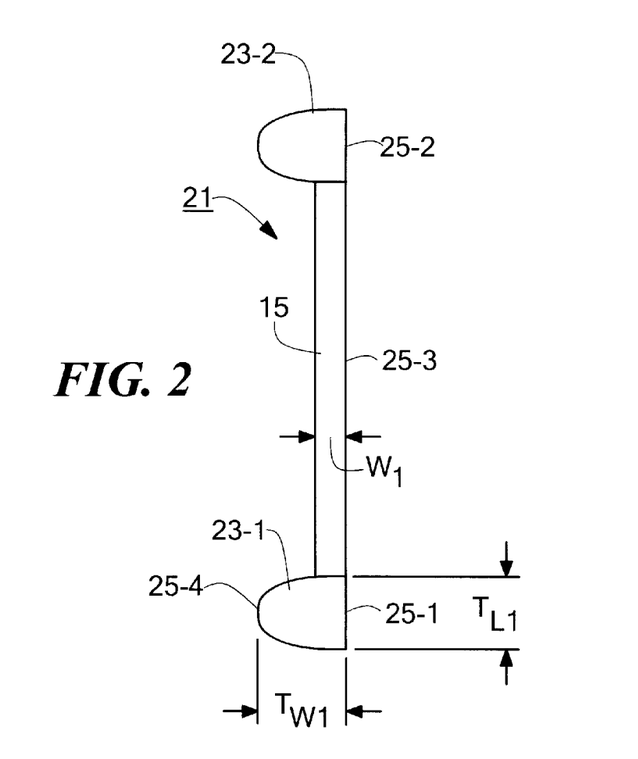
FIG. 2 is an enlarged end view of an individual plastic staple obtained from the length of conventional continuously connected fastener stock of FIG. 1.

Referring now to FIG. 2, there is shown an enlarged end view of an individual plastic staple obtained in the aforementioned manner from a length of fastener stock 11, the individual plastic staple being represented generally by reference numeral 21.

Staple 21 comprises a first cross-bar 23-1, which has been cut from side member 13-1, and a second cross-bar 23-2, which has been cut from side member 13-2, cross-bars 23-1 and 23-2 being interconnected by flexible filament 15. As can be seen, due to the conventional rotary extrusion process by which stock 11 is formed, cross-bars 23-1 and 23-2 and filament 15 are flat on sides 25-1, 25-2 and 25-3, respectively, sides 25-1, 25-2 and 25-3 being coplanar with one another. (The remaining surfaces of filament 15 and cross-bars 23-1 and 23-2 are curved.) As a result, as can be seen, cross-bar 23-1 and filament 15 collectively have a generally "d"-shape when viewed from an end, with cross-bar 23-1 having a substantially semi-oval shape in cross-section. Cross-bar 23-1 has a transverse width $Tw_1$ greater than its transverse length $Tl_1$. Filament 15 has a width $w_1$. Cross-bar 23-2 and filament 15 also collectively have a generally "d"-shape when viewed from an end, with cross-bar 23-2 being sized and shaped identically to cross-bar 23-1.

Figure 3:
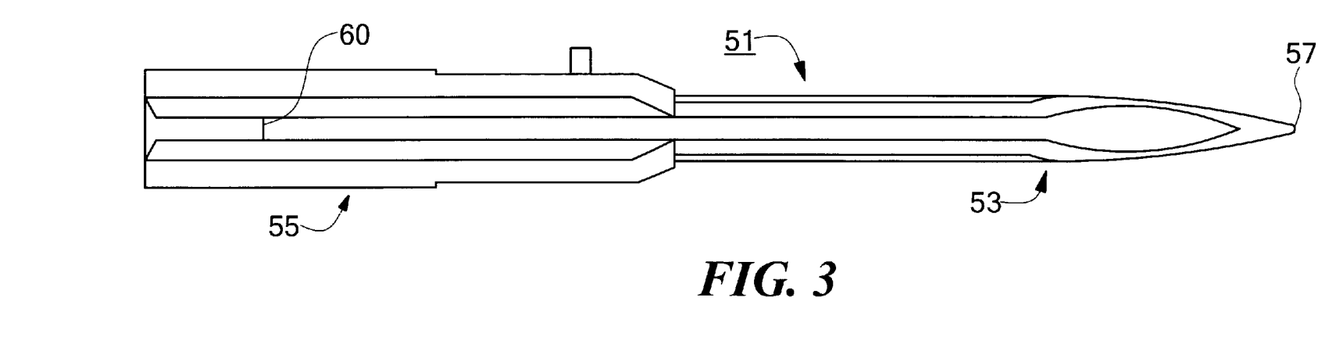
FIG. 3 is a top view of a conventional needle adapted for use in dispensing fasteners, such as the plastic staple of FIG. 2.
Figure 4:
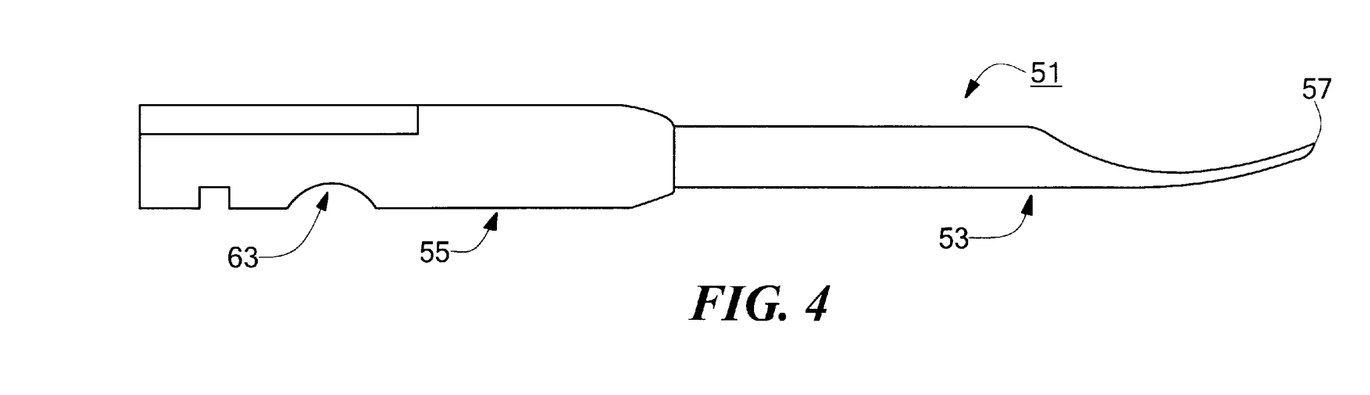
FIG. 4 is a left side view of the needle shown in FIG. 3.

Referring now to FIGS. 3 and 4, there are shown top and left side views, respectively, of a conventional needle adapted for use in dispensing fasteners, such as the plastic staple of FIG. 2, said needle being represented generally by reference numeral 51.

Needle 51 comprises a stem portion 53 and a base portion 55. Stem portion 53 may be made, for example, by stamping and rolling or by machining a piece of metal (e.g., stainless steel) or by the electroforming/machining technique described in U.S. Pat. No. 5,489,057, inventor Deschenes, issued Feb. 6, 1996, the disclosure of which is incorporated herein by reference.

Figure 5:
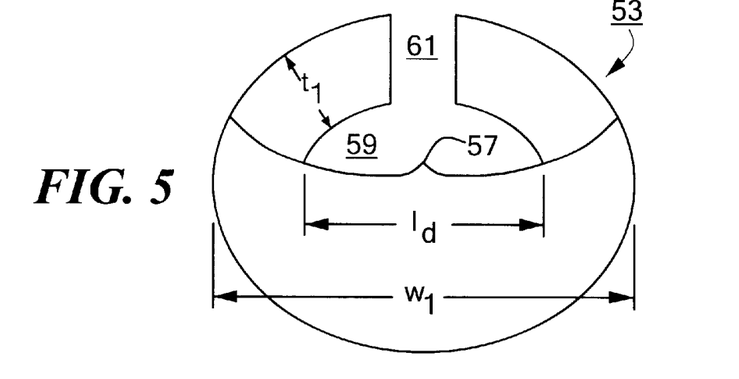
FIG. 5 is a front view of the stem portion of the needle shown in FIG. 3.

Referring now to FIGS. 3 through 5, stem portion 53 can be seen to be an elongated member that is substantially cylindrical over most of its length (and annular in transverse cross-section). The front end of stem portion 53 is formed into a spoon-shaped tip 57, tip 57 being sufficiently sharp to enable its penetration into a desired article of commerce. A generally cylindrical bore 59 extends longitudinally across substantially the entire length of stem portion 53. Bore 59 is appropriately dimensioned to receive a cross-bar of a plastic fastener, such as cross-bar 23-1 of plastic staple 21. Stem portion 53 is also shaped to include a slot 61 extending longitudinally across substantially the entire length of stem portion 53, slot 61 being appropriately dimensioned to permit a filament, such as filament 15, to extend therethrough while its associated cross-bar is disposed within bore 59.

A conventional stamped and rolled stainless steel stem portion 53 used in the dispensing of plastic staples 21 typically has a width $w_1$ of about 0.068 inch and a cross-sectional thickness $t_1$ of about 0.013–0.0165 inch.

Referring back to FIGS. 3 and 4, base portion 55 is made in the conventional manner by insert-molding plastic onto the rear end 60 of stem portion 53. Base portion 55, which is generally cylindrical in shape, includes a generally cylindrically-shaped longitudinal bore aligned with (and sized similarly to) bore 59 of stem portion 53 and also includes a longitudinal slot aligned with (and sized similarly to) slot 61 of stem portion 53. Base portion 55 is provided with a recessed area 63 for use in correctly positioning needle 51 within a fastener dispensing tool and for locking the same into place.

Figure 6:
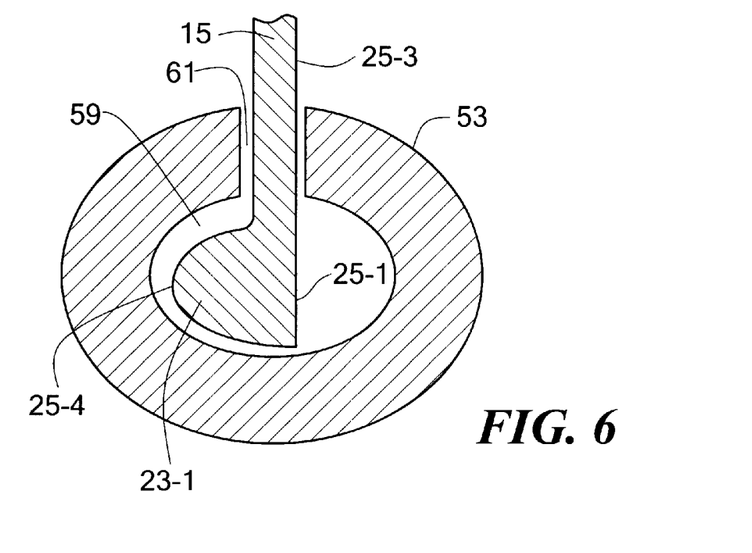
FIG. 6 is a transverse section view of the stem portion of the needle of FIG. 3, the plastic staple of FIG. 2 being disposed therewithin.

Referring now to FIG. 6, there is shown a transverse section view of stem portion 53, with plastic staple 21 being loaded therein. As described above, the present inventor has noted that, because filament 15 and cross-bar 23-1 are flat on sides 25-3 and 25-1, respectively, whereas bore 59 is circular in transverse cross-section and slot 61 bisects bore 59 from the top thereof, a considerable portion of bore 59 is left unoccupied by staple 21. Consequently, because cross-bar 23-1 is much smaller than bore 59 and has considerable freedom to move laterally within bore 59, the proper translational movement of cross-bar 23-1 through bore 59 during ejection cannot be assured.

Figure 7:
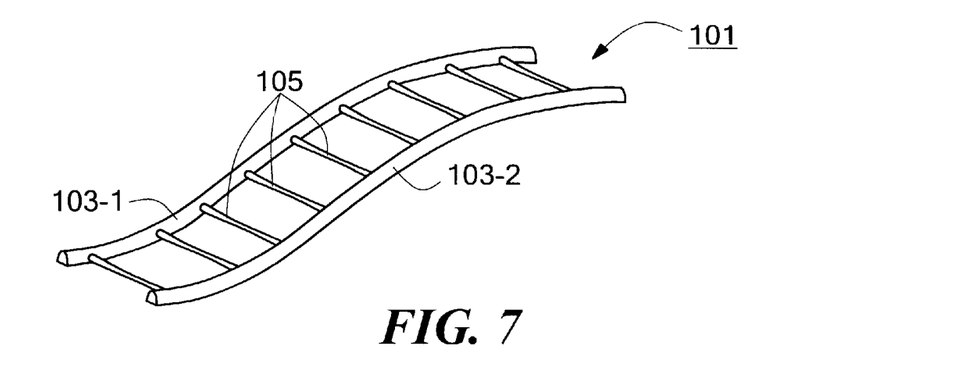
FIG. 7 is a perspective view of a first embodiment of a length of plastic staple stock constructed according to the teachings of the present invention.
Figure 8:
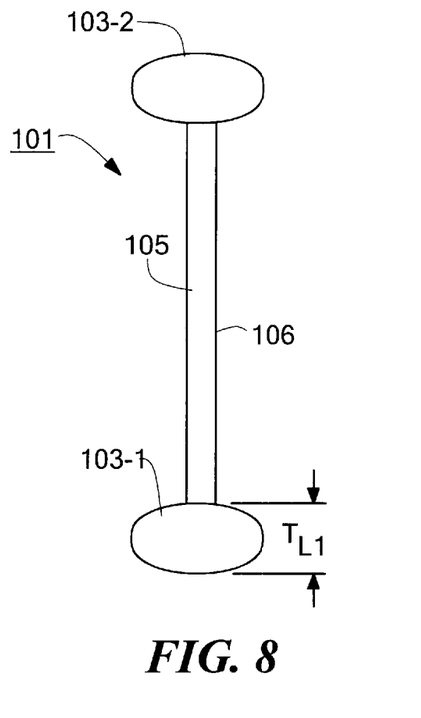
FIG. 8 is an end view of the length of plastic staple stock shown in FIG. 7.

Referring now to FIGS. 7 and 8, there are shown perspective and end views, respectively, of a length of continuously connected fastener stock of the plastic staple variety that has been fabricated in accordance with the teachings of the present invention, said length of fastener stock being represented generally by reference numeral 101.

Figure 9:
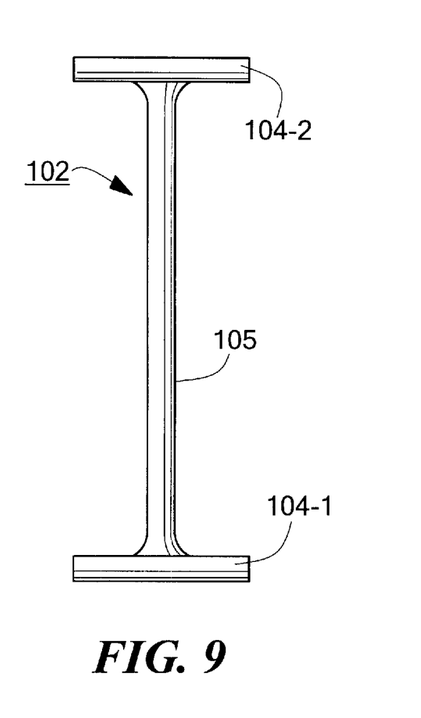
FIG. 9 is an enlarged side view of an individual plastic staple obtained from the length of plastic staple stock of FIG. 7.

Fastener stock 101 is similar in many respects to fastener stock 11, fastener stock 101 comprising a pair of elongated, uniform and continuous side members 103-1 and 103-2 that are coupled together by a plurality of flexible cross-links 105 equidistantly-spaced apart by a distance of 0.25 inch. (It should be understood that the distance between adjacent cross-links 105 need not be 0.25 inch and may be, for example, about 0.18 inch; such a modification in cross-link spacing would, however, require the use of a molding wheel having a correspondingly formed impression.) An individual plastic fastener 102 that has been cut from fastener stock 101 is shown separately in FIG. 9 and can be seen to include a pair of cross-bars 104-1 and 104-2 interconnected by a cross-link 105.

As seen best in FIG. 8, fastener stock 101 differs significantly from fastener stock 11 in that side members 103-1 and 103-2 do not have a flat side. (Cross-link 105, however, does have a flat side 106 that is similar to side 25-3 of filament 15.) Instead, side members 103-1 and 103-2 are elliptical in transverse cross-section, with cross-links 105 symmetrically bisecting side members 103-1 and 103-2.

One of the advantages of stock 101, as compared to stock 11, is that side members 103 (and the individual cross-bars derived therefrom) have a cross-sectional transverse shape that corresponds more closely to that of bore 59 of needle 51. (Some proportional scaling down of the cross-sectional size of members 103 may be needed to permit the cross-bars derived from member 103 to fit properly within bore 59.) Consequently, improved engagement of the cross-bar by the ejector rod and improved translational movement of the cross-bar through the length of bore 59 is made possible.

Figure 10A:
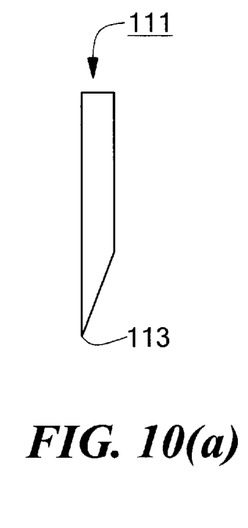
FIGS. 10(a) and 10(b) are side and perspective views, respectively, of a first embodiment of a skiving knife constructed according to the teachings of the present invention.

Fastener stock 101 may be fabricated by the conventional rotary extrusion method, with one notable exception. Instead of being made using a conventional skiving knife, which has a straight bottom surface or edge (hence, flat sides 25-1, 25-2 and 25-3 of fastener stock 11), fastener stock 101 is made using the skiving knife of FIGS. 10(a) and 10(b), said skiving knife being constructed in accordance with the teachings of the present invention and being represented generally by reference numeral 111.

Figure 10B:
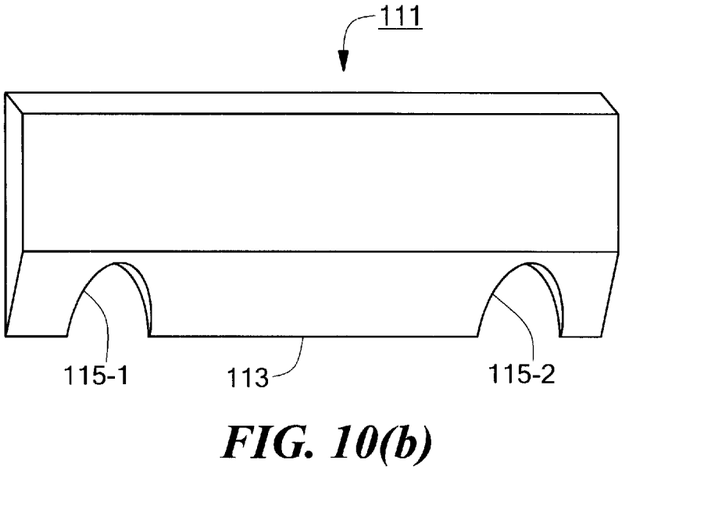

As can be seen best in FIG. 10(b), knife 111 includes a bottom edge 113, bottom edge 113 being provided with a pair of cut-away portions 115-1 and 115-2, cut-away portions 115-1 and 115-2 being appropriately spaced apart to permit their alignment with the impressions used to make side members 13-1 and 13-2, respectively. In the present embodiment, cut-away portions 115-1 and 115-2 are complementarily shaped relative to side members 13-1 and 13-2, respectively, so that filament 105 symmetrically bisects side members 103-1 and 103-2. It should be understood, however, that cut-away portions 115-1 and 115-2 need not be shaped in this manner and may assume virtually any shape. For example, cut-away portions 115-1 and 115-2 may be shaped to match the transverse cross-sectional shape of side members 13-1 and 13-2, respectively, so that the filament of the resultant fastener stock asymmetrically bisects the side members. It should also be understood that one of cut-away portions 115-1 and 115-2 could be eliminated entirely if one wished to provide only one of side members 13-1 and 13-2 with a non-flat geometry. This may be desirable, for example, where the continuously connected fastener stock is not of the plastic staple variety, but rather, is of the type wherein one of the side members is shaped to include a plurality of cross-bars interconnected end-to-end by severable connectors and the other of the side members is shaped to include a plurality of paddles interconnected end-to-end by severable connectors.

Figure 11A:
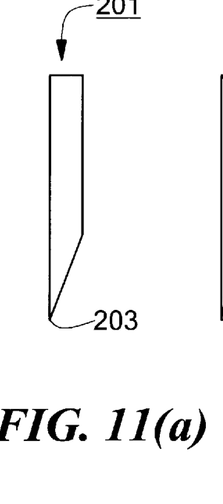
FIGS. 11(a) and 11(b) are side and perspective views, respectively, of a second embodiment of a skiving knife constructed according to the teachings of the present invention.
Figure 11B:
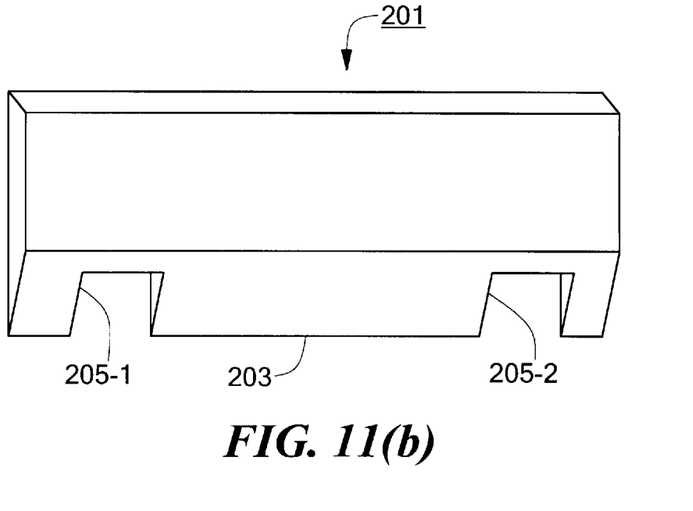

Referring now to FIGS. 11(a) and 11(b), there are shown side and perspective views, respectively, of a second embodiment of a skiving knife constructed according to the teachings of the present invention, said skiving knife being represented generally by reference numeral 201.

As seen best in FIG. 11(b), skiving knife 201 is similar in many respects to skiving knife 111, the principal difference between the two knives being that skiving knife 201 is provided with a bottom edge 203 having a pair of rectangular cut-away portions 205-1 and 205-2, as compared to the arcuate cut-away portions 115-1 and 115-2 of knife 111. Knife 201 is adapted for, but is not limited to, use in combination with a modified molding wheel whose side member impressions are rectangular, as opposed to semi-elliptical, in transverse cross-section and whose cross-link impressions include a rounded surface. An example of a length of plastic staple stock fabricated using knife 201 and a molding wheel as described above is shown in FIGS. 12 and 13, said length of stock being represented generally by reference numeral 251. Stock 251 comprises a pair of side members 253-1 and 253-2 of rectangular transverse cross-section interconnected by a plurality of equidistantly-spaced cross-links 255 of a truncated cylindrical or semi-cylindrical transverse cross-section.

Figure 12:
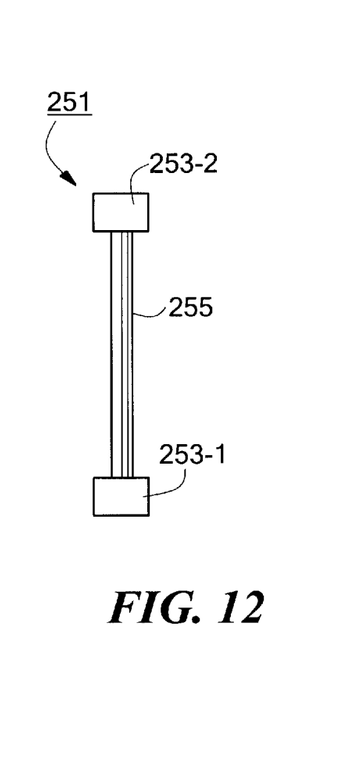
FIG. 12 is an end view of a second embodiment of a length of plastic staple stock constructed according to the teachings of the present invention.
Figure 13:
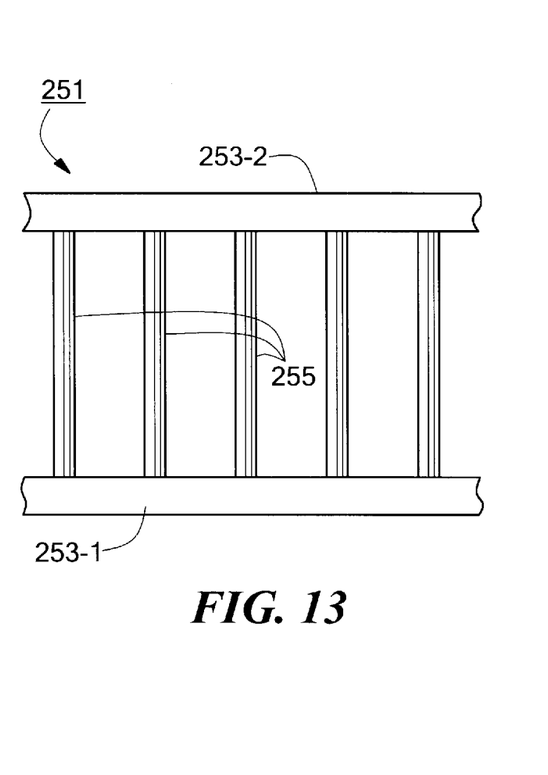
FIG. 13 is a fragmentary front view of the length of plastic staple stock shown in FIG. 12.

Stock 251 may be used with needle 51, some proportional scaling down of the cross-sectional size of members 253 possibly being needed to permit the cross-bars derived from members 253 to fit properly within bore 59. Alternatively, a needle having a rectangularly-shaped bore may be used, instead of needle 51, with stock 251.

Although cross-links 255 symmetrically bisect side-members 253-1 and 253-2 in the embodiment shown, it can readily be appreciated that, by modifying the size of cut-away portions 205-1 and 205-2, a length of fastener stock can be obtained in which cross-links 255 asymmetrically bisect the resultant side members.

It should be understood that fastener stock having side members of a variety of alternative transverse cross-sectional shapes, including circular, can be obtained by appropriately shaping the side member impressions in the molding wheel and the cut-away portions in the skiving knife.

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:

1. A method of fabricating continuously connected fastener stock, said method comprising the steps of:
   (a) providing a rotating molding wheel, said rotating molding wheel being provided with a peripheral impression comprising a pair of peripherally-extending side members interconnected by a plurality of cross-links;
   (b) extruding molten plastic into the peripheral impression of said rotating molding wheel, with a layer of controlled film overlying the peripheral impression;
   (c) allowing the molten plastic to solidify;
   (d) using a knife in substantially elliptical contact with the peripheral impression to skive excess plastic from the rotating molding wheel, said knife having a bottom provided with a first cut-out portion aligned with one of said peripherally-extending side members so as to augment the transverse cross-sectional size thereof; and
   (e) removing the continuously connected fastener stock thus formed from the rotating molding wheel.

2. The method as claimed in claim 1 wherein said peripheral impression is formed around the entire periphery of said rotating molding wheel.

3. The method as claimed in claim 2 wherein said bottom of said knife is further provided with a second cut-out portion aligned with the other of said peripherally-extending side members so as to augment the transverse cross-sectional size thereof.

4. The method as claimed in claim 3 wherein each of said peripherally-extending side members of said peripheral impression is generally uniform and semi-elliptical in transverse cross-section and wherein each of said cross-links of said peripheral impression is generally semi-circular in transverse cross-section.

5. The method as claimed in claim 4 wherein each of said first and second cut-out portions is complementarily shaped relative to its respective peripherally-extending side member of said peripheral impression so that each cross-link of the continuously connected fastener stock symmetrically bisects the side members of the continuously connected fastener stock.

6. The method as claimed in claim 3 wherein each of said peripherally-extending side members of said peripheral impression is generally rectangular in transverse cross-section and wherein each of said cross-links of said peripheral impression is generally semi-circular in transverse cross-section.

7. The method as claimed in claim 6 wherein each of said first and second cut-out portions is complementarily shaped relative to its respective peripherally-extending side member of said peripheral impression so that each cross-link of the continuously connected fastener stock symmetrically bisects the side members of the continuously connected fastener stock.

* * * * *